No. 680,101. Patented Aug. 6, 1901.
V. M. WINGFIELD & J. T. LITTLE, Jr.
NUT LOCK.
(Application filed Dec. 4, 1900.)
(No Model.)
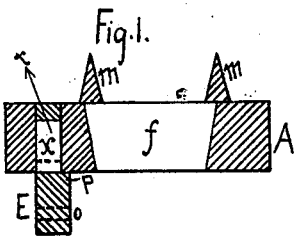
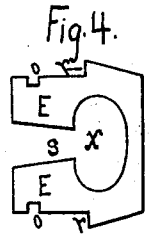
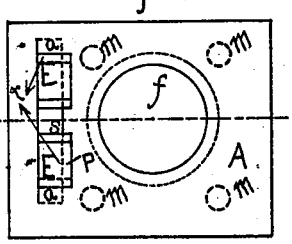
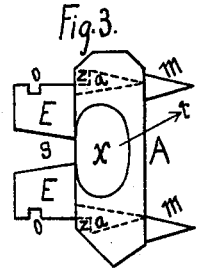
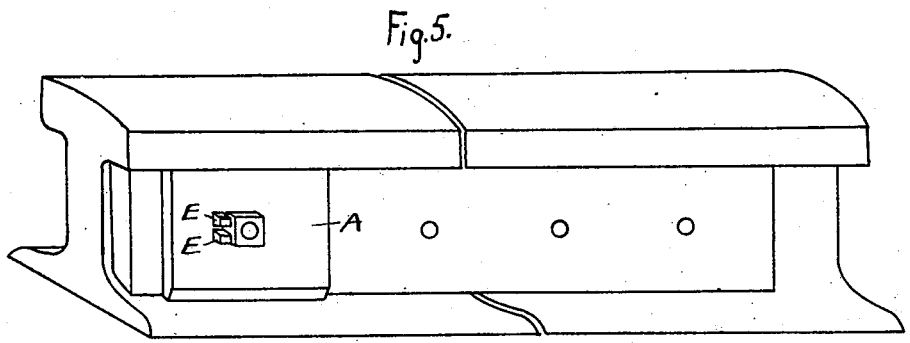
WITNESSES
INVENTORS.
Virgil M. Wingfield
and John T. Little, Jr.
BY
ATTORNEY.

UNITED STATES PATENT OFFICE.

VIRGIL M. WINGFIELD AND JOHN T. LITTLE, JR., OF OLATHE, KANSAS.

NUT-LOCK.

SPECIFICATION forming part of Letters Patent No. 680,101, dated August 6, 1901.

Application filed December 4, 1900. Serial No. 38,713. (No model.)

*To all whom it may concern:*

Be it known that we, VIRGIL M. WINGFIELD and JOHN T. LITTLE, Jr., citizens of the United States, residing at Olathe, in the county of Johnson and State of Kansas, have invented a new and useful Nut-Lock, of which the following is so full, clear, and exact a description as will enable others skilled in the art to which our invention appertains to make and use the same, reference being had to the accompanying drawings.

This invention relates to an improvement in nut-locks or means for holding the nut firmly on the bolt, and thereby preventing the nut from turning and dropping from the bolt, and which will obviate the necessity of keeping constant watch in order that the nut shall not be loosened from the bolt.

In the accompanying drawings, illustrating our invention, Figure 1 is a horizontal cross-section taken through the middle of the lock; Fig. 2, a plan view, and Fig. 3 an end view. Fig. 4 is a separate drawing of the part E E, which is a spring-fastener; and in Fig. 5, at the left end of the fish-plate, is the nut-lock as it is used in practice, fitting against the fish-plate and holding the nut firm from turning.

Similar letters of reference designate similar parts throughout the several views.

The nut-lock consists of two parts, the washer A and the spring-fastener E E. The washer A (shown in a plan view in Fig. 2) is made of any suitable material and in size to suit the particular case. A circular aperture at $f$ extends through the washer, flanging out on the inside against the fish-plate. Through this aperture the thread end of the bolt is passed after having first been put through the rail and the two fish-plates. This aperture is made in diameter to accommodate the bolt, and by being made to flange out against the fish-plate, as in this case, it will accommodate a slightly-bent bolt. It may also be made of the same diameter entirely through the washer. Another aperture at $t$ extends through the washer. This aperture may extend entirely through the washer or into the washer far enough to satisfy a required case. The size of this aperture (shown in Figs. 1, 2, and 3) is made so that the key E E will fit tightly within it and prevent the nut from turning. The shape of this aperture is shown in Fig. 3. The said aperture is not of the same vertical length entirely through the washer; but after extending in from the face of the washer the distances $z\ z$ there are offsets $a\ a$ in the bottom and top of the aperture, so as to accommodate the catches $r\ r$, which are explained below in the description of said fastener E E. The size of the offsets is made to suit the particular case, and they extend into said washer far enough so that the catches $r\ r$ on the spring-fastener E E by resting against the offsets $a\ a$ hold the fastener firmly in position. The amount of extent vertically of the offsets $a\ a$ from the bottom and top of the aperture $t$ is also made to suit the particular case. The bottom and top of the washer A are cut at certain angles, so as to fit close against the rail. The degree of these angles depends upon the position of the lock with respect to the surrounding parts, in this case depending upon the angles made by the fish-plate and flange of the rail at the bottom and fish-plate and ball of the rail at the top of said washer A.

While the drawings in this case show the nut-lock preventing the nut on the bolt of a railroad-rail from turning, yet the lock may be used in any case where there is danger of the nut becoming loose and turning. In this case, Fig. 5, the fish-plate by making certain angles with the flange and ball of the rails holds the washer from turning; but if the washer rested upon a smooth surface then it would turn with the nut. To remedy this, the spurs $m\ m\ m\ m$, Figs. 1, 2, and 3, are placed on the back of the washer. These spurs are of convenient size and material and are either a part of the washer or are screwed into it. If the surface on which the washer rests is wood, then the spurs may be driven into the surface of the wood and prevent the washer from turning. If the surface is metal or some other hard substance, then holes may be drilled into the surface over which the washer rests for the reception of said spurs. When the shape of the surrounding mechanism prevents the washer from turning, these spurs are unnecessary and may be removed from said washer.

The spring-fastener E E, mentioned above and shown in Figs. 1, 2, and 3 and in a separate drawing in Fig. 4, is made of suitable material and in size and shape to satisfy the particular case. Said spring-fastener fits into the aperture $t$ and extends out from the face of the washer, resting against or close to the side of the nut, which has been screwed onto the bolt after the bolt is first passed through the washer A. Said spring-fastener E E has the small depressions $o\ o$ on the top and bottom of that part which extends out from the face of the washer A. The object of these depressions is to afford a place for nippers or some convenient tool to grip the fastener when it is pulled out or inserted into the washer A. The size of these depressions may be made to suit the particular case. The width of the part of the spring-fastener which extends out from the face of the washer A may be made the same as that of the aperture $t$ or of different sizes to suit the particular case. It is made in this case to extend out the distance P, Figs. 1 and 2, farther on one side than the other, so as to accommodate different sizes of nuts by changing the side of the fastener which rests against the nut. The vertical length of the fastener outside of the washer is the same as that of the aperture $t$, but may be made to suit the particular case. The spring part of the fastener which extends into the washer may be made many different shapes without departing from the same principle. In this case the part of the fastener which extends into the washer is hollowed out at $x$, Figs. 1, 3, and 4, making the surface around $x$ such a thickness that it will give a strong spring to the fastener and will hold the catches $r\ r$ of the spring-fastener firmly against the offsets $a\ a$ of the washer A. (Shown in Fig. 3.) The hollowed-out portion $x$ of the fastener extends out through the part of the fastener which is outside of the washer through the space $s$. (Shown in Figs. 2, 3, and 4.) The object of the space $s$ is to allow the parts of the fastener on each side of said space $s$ to be pressed together when the spring-fastener is taken out or inserted into the washer A. The shapes of the hollowed-out portions $x$ and $s$ are made to satisfy the required case. In this case the periphery of the spring-fastener on each side of $s$ tapers toward the end of the fastener; but the shape of said periphery may be made as desired. The thickness of the part of the fastener which extends into the washer is made the same as the thickness of the aperture $t$, so that it will fit tight within said aperture. The shape of the outside periphery of the fastener around $o$ is made so that it fits close to the sides of the aperture $t$. By inserting the fastener directly into the fish-plate it will be unnecessary to have an additional washer resting upon the said fish-plate. This may be accomplished by having the aperture $t$, into which the spring-fastener E E is inserted, formed directly into the fish-plate. The apertures in said fish-plate may be formed close to the apertures for the reception of the bolts, as shown in Figs. 1 and 2, thus doing away with a separate additional washer for each bolt. Where angle or channel bars are used to connect the rails, by forming apertures in the said angle or channel bars close to the apertures for the reception of the bolts it will be unnecessary, as in the case of the fish-plate, to use additional washers. An aperture may also be made in any piece used as a washer close to the aperture through which the bolt passes for the reception of the spring-fastener.

In mechanisms where it is unnecessary to have a washer between the nut and surface through which the bolt is passed then the aperture for the reception of the spring-fastener may be formed in said surface.

We do not wish to be understood as limiting ourselves to the exact construction; but, as we have stated above, its details in regard to different shapes of the parts might be varied without departing from the spirit of our invention or interfering with its usefulness.

What we do claim, and wish to secure by Letters Patent, is—

1. In a nut-lock a fastener provided with a head and spring-arms projecting therefrom having catches, the head of said fastener adapted to be inserted in an aperture in proximity to the side of a nut and prevent the same from turning, substantially as described.

2. A nut-lock comprising two members, one member having apertures one of which is provided with offsets, and the other member provided with a head adapted to be inserted into said aperture and engage said offsets, substantially as described.

3. A nut-lock comprising a plate having apertures one of which is provided with offsets, a fastener having a head adapted to be inserted into said aperture, and spring-arms each provided with a catch adapted to engage the offsets thereof, substantially as described.

4. A nut-lock comprising a plate having an aperture with inclined walls, an aperture with offsets, and a fastener having spring-arms each provided with a catch adapted to engage the offsets of the plate, substantially as described.

5. A nut-lock comprising a plate having apertures one of which is provided with offsets, spurs, and a fastener provided with a wedge-shaped head having spring-arms with catches, each of said arms having its inner side inclined outwardly, said catches adapted to engage said offsets, substantially as described.

6. In a nut-lock the combination of a washer having two apertures extending through it from its side, for the reception of a spring-fastener and a bolt, and on the back of said washer a convenient number of spurs for engaging the surface upon which the washer rests.

7. In a nut-lock the combination of a washer A having two apertures $t$ and $f$ extending through it from its side, aperture $t$ shaped for the reception of a spring-fastener E E and aperture $f$ shaped for the reception of a bolt, said washer A having its bottom and top cut at certain angles, and said washer A having the spurs $m\ m\ m\ m$ attached to its back, all substantially as shown and for the purposes set forth.

8. A nut-lock comprising a plate having apertures, a fastener provided with spring-arms having catches to engage one of the apertures of said plate, said arms extending laterally inward toward the nut it is desired to lock, substantially as described.

9. A nut-lock comprising a plate provided with apertures, a fastener having spring-arms, a head the upper portion of which projects above one of said spring-arms, and the lower portion below the other spring-arm forming catches which are adapted to engage one of the apertures of said plate, substantially as described.

10. A nut-lock comprising a plate having an aperture with its walls inclined from the front to the rear of said plate, and an aperture adapted to receive a spring-fastener, substantially as described.

11. A nut-lock comprising a plate provided with apertures, a fastener having a head provided with catches, said head adapted to be inserted in one of said apertures and the catches to engage therewith, and spring-arms with depressions on their outer ends, substantially as described.

VIRGIL M. WINGFIELD.
    JOHN T. LITTLE, Jr.

Witnesses as to signature of Virgil M. Wingfield:
 J. H. RILEY,
 J. C. NOEL.

Witnesses as to signature of John T. Little, Jr.:
 B. J. BERNHARD,
 CHAS. CARLSON.